May 7, 1968  H. S. MAPLES  3,381,516
TRANSMITTER-RECEIVER CALIBRATOR
Filed Aug. 13, 1965

Howard S. Maples,
INVENTOR.

BY Harry M. Saragovitz
Edward J. Kelly
Herbert Berl
Alfred E. Smith

United States Patent Office 3,381,516
Patented May 7, 1968

3,381,516
TRANSMITTER-RECEIVER CALIBRATOR
Howard S. Maples, P.O. Box 114,
Paint Rock, Ala. 35764
Filed Aug. 13, 1965, Ser. No. 479,677
3 Claims. (Cl. 73—1)

ABSTRACT OF THE DISCLOSURE

An electro-mechanical calibrator used for calibrating an electrical signal transmitter and a signal receiver. The calibrator comprises two major portions. One of these portions is a timer that records periods of electrical signal flow, and the other portion is a liquid switch, controlled by mechanical means, and regulating the period of electrical signal flow to a receiver.

---

The invention described herein may be manufactured and used by or for the Government for governmental purposes without the payment of any royalty thereon.

The present invention relates to an electro-mechanical calibrator and particularly to a calibrator for use with both a liquid level pressure to electrical signal transmitter on the bottom of a remotely located water tank and to a signal receiver located in a water plant.

The device of the present invention comprises two major portions: One being a push-button type timer switch and a timer to record periods of time during which a current flows, and the other a constant speed motor operated cam and mechanical arm with a magnet attached thereto for controlling the opened and closed time of a liquid switch.

The above mentioned remotely located water tank has a transmitter located at the bottom of the tank, with a pressure hose connected from inside the bottom of the tank into the mechanical pressure arm segment of the transmitter, which has a constant speed motor operated cam that contacts the arm intermittently. The length of the contact time is directly proportional to the pressure from the water depth inside the tank. As long as the arm and cam are in contact, a mercury switch completes an electrical circuit to a receiver inside the water plant. The receiver converts the intermittent electrical signals from the transmitter into an output that is recorded on a twenty four hour circular chart. The conversion takes place by a magnetic clutch system, where the amount of clutch movement is directly proportional to the time of magnet activation by the electrical current from the transmitter.

The calibrator is plastic encased, completely portable and light weight, weighing only 6 pounds. Before this invention was put into the use the accuracy check method was very cumbersome, time consuming and not as accurate as is now the case. The previous method of calibrating the transmitter was by the use of a voltmeter and stop watch. Needless to say the time lag between the voltmeter indication and the starting and stopping of the stop watch could be great and thus result in inaccurate calibration. If the transmitter or receiver were faulty, they would have to be removed from their location, be taken to the instrument shop, and tested on a test panel. This method of calibration resulted in wasted man hours and inconveniences to the personnel at the water plant.

Accordingly, an object of the present invention is to provide a handy and accurate pressure-time and time-pressure conversion calibration.

Another object of the invention is to provide a portable time saving calibrator.

Other objects and many of the attendant advantages of this invention will become readily appreciated as the same becomes better understood by reference to the following detail description when considered in connection with the accompanying drawings, in which.

Figure 1:
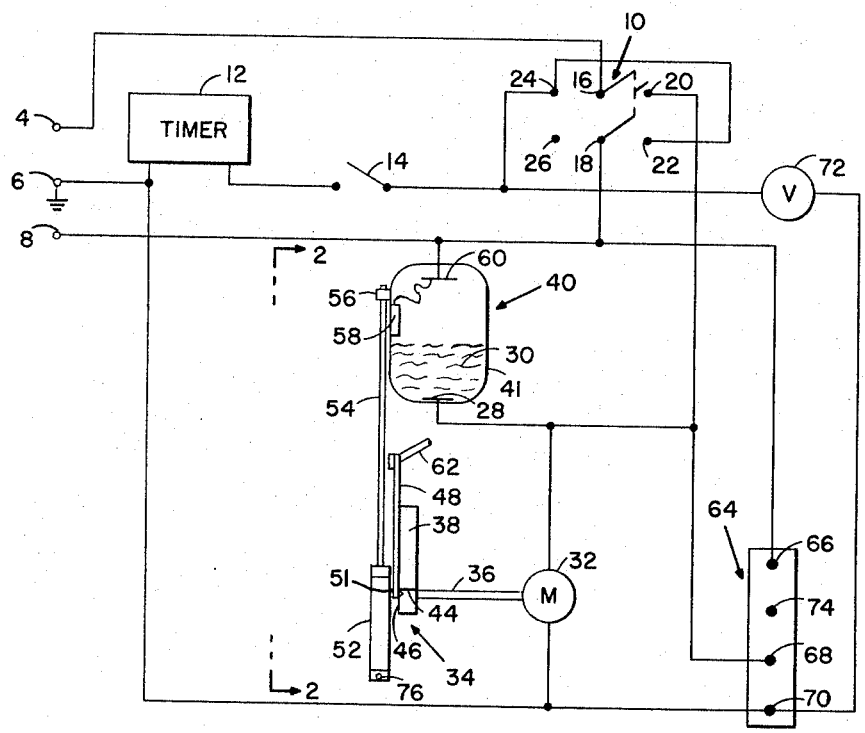
FIGURE 1 is a schematic diagram illustrating a preferred embodiment of a calibrator according to the invention.

Referring to FIGURE 1, input terminal 4 is connected to terminal 16 of double-pole double-throw switch 10. A second input terminal 8 is connected to terminal 18 of double-pole double-throw switch 10. When double-pole double-throw switch 10 is closed to the right, a circuit is completed from input terminal 4 through terminals 16 and 20 to terminal 28 of liquid switch 40, to one side of constant speed motor 32 and is connected to terminal 68 of terminal block 64. Also when double-pole double-throw switch 10 is closed to the right, a circuit is completed from input terminal 8 through terminal 18 to terminals 22 and 24, one side of timer switch 14 and voltmeter 72. Input terminal 8 is further connected to terminal 60 of liquid switch 40, and to terminal 66 of terminal block 64. Terminal 26 of double-pole double-throw switch 10 is not connected. Terminal 70 of terminal block 64 is connected to a common ground terminal 6. The other side of timer switch 14 is connected to a timer 12. Timer 12, motor 32 and voltmeter 72 are grounded to common ground terminal 6 and terminal block 70. Terminal 74 of terminal block 64 is not connected. Cam 34 is rotated at a constant speed of one revolution every fifteen seconds by motor shaft 36, that is connected to the cam from constant speed motor 32. Cam 34 is dimensioned such that the radius from the center of motor shaft 36 to a concentric circle 42 (FIGURE 2) subtended on cam face 46 by pointer 49 will be inversely proportional to the length of the concentric circle traced on cam face 46. The length of concentric circle 42 is measured on cam face 46 from leading edge 44 to trailing edge 38. When cam side 46 contacts end point 49 of pointer mechanism 48, mechanism 48 is moved outwardly to cause frame 52 to rotate about pivot 76. Arm 54 is rigidly attached to frame 52 at one end and has magnet 56 attached at its other end. Magnet 56 is removed from the side of glass bulb 41 of liquid switch 40 when end point 49 is in contact with cam side 46. After end point 49 has passed off cam side 46, arm 54 is pulled back into contact with glass bulb 41 by gravity or other conventional means. Metallic core 58 is raised out of liquid pool 30 and is positioned alongside magnet 56, when the magnet is on the side of glass bulb 41. Metallic core 58 will again fall back into electrically conductive liquid pool 30 of liquid switch 40 when magnet 56 is removed from the side of glass bulb 41. The circuit from terminal 28 to terminal 60 is, thus, switched "off" and "on" by the position of metallic core 58. The position of end point 49 of pointer mechanism 48 relative to cam face 46 is controlled by a force exerted on shaft 62 that causes the two arms of pointer mechanism 48, that are rigidly connected to each other, to rotate about axis 50.

In operation, for calibrating a receiver, and A-C signal is applied to terminal 4 and through terminals 16 and 20 of double-pole double-throw switch 10 to one side of constant speed motor 32. The same A-C signal is connected to terminal 28 of liquid switch 40. A check for presence of the A-C signal at terminal 4 can be made by closing double-pole double-throw switch 10 to the left, connecting the signal through terminals 16 and 24 to one side of voltmeter 72. The voltmeter circuit is completed to ground terminal 6 through terminal 70 of terminal block 64. Constant speed motor 32 is also grounded to common ground terminal 6. The A-C signal connected to constant speed motor 32 causes the motor to rotate at a constant speed of one revolution every fifteen seconds. Motor shaft 36 transmits rotation to cam 34 at the same speed of one revolution every fifteen seconds.

Figure 2:
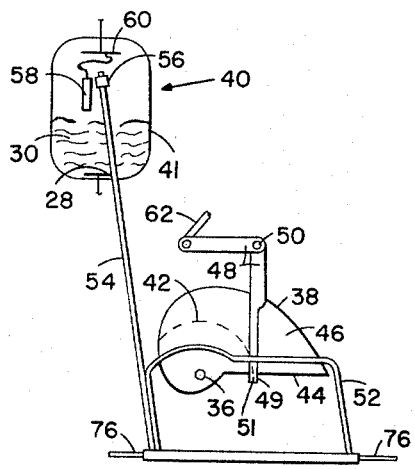
FIGURE 2 illustrates a sectional view of a portion of FIGURE 1 showing details of a cam and switch arrangement.

Referring to both FIGURES 1 and 2, cam 34 is rotated in a clockwise direction such that leading edge 44 of the cam lifts pointer 49, of pointer mechanism 48, up to ride across cam face 46 (in a concentric circle as represented by numeral 42) until the pointer drops off spiral trailing edge 38. The back portion 51, of pointer mechanism 48, forces frame 52 to rotate upward from cam 34 about pivot 76 when pointer 49 is riding on cam side 46. Magnet 56, at the opposite end of arm 54 from frame 52, is moved away from the side of glass bulb 41 where it has been resting by the force of gravity. Magnetic core 58 connected by a flexible conductor to terminal 60 of liquid switch 40, has been drawn up out of liquid pool 30 toward magnet 56 at the side of the bulb, and is now released to fall back in the liquid pool. When end point 49 moves off cam face 46 at spiral trailing edge 38, magnet 56 comes back to rest on the side of glass bulb 41 by the pull of gravity on frame 52 and arm 54. Magnetic core 58 is drawn out of liquid pool 30 again toward magnet 56. The A-C signal present at terminal 28 is, thus, intermittently connected to terminal 60 by the movement of magnet 56 in and out from the side of glass bulb 41 of liquid switch 40.

The time liquid switch 40 is closed from terminal 28 to terminal 60 is determined by the amount of time end point 49 rides on cam side 46, from leading edge 44 to spiral trailing edge 38. Leading edge 44 contacts end point 49 every fifteen seconds. The amount of the fifteen seconds that end point 49 rides on cam side 46 is in inverse ratio to the distance out frame 52 from motor shaft 36 that end point 49 is when it first contacts leading edge 44. An example is that, if end point 49 is moved further out from motor shaft 36 than as shown in FIGURE 2, concentric circle 42 would drop off spiral trailing edge 38 earlier, and thus, liquid switch 40 would be closed a smaller amount of time. A knob (not shown) on the front of the calibrator positions end point 49 along frame 52. The knob is directly connected to shaft 62, where any force applied to the shaft is further transmitted to pointer mechanism 48 which will rotate end point 49 about axis 50 and along frame 52.

In calibrating a receiver, the intermittent A-C signal from the calibrator at terminal 8 is substituted for the A-C signal from an electrical transmitter. With double-pole double-throw switch 10 closed to the right, the output side of liquid switch 40, at terminal 60, is further connected to timer switch 14, through terminals 18, 22 and 24. The time that liquid switch 40 is closed is controlled by movement of the knob, as stated in the previous paragraph. Timer 12 and timer switch 14 are further located on the front of the calibrator. An operator can visually read the amount of time in each fifteen second cycle that liquid switch 40 is closed by closing timer switch 14 to activate timer 12, and thus, read the time registered on the timer. Timer switch 14 may be closed for more than one cycle and then divide the number of cycles into the time registered on the timer, if more accuracy is desired. The intermittent electrical signals at terminal 8 are applied to the receiver, which converts the average time of the electrical signals into an output recorded on a twenty-four hour circular chart, and read as depth of water in a water tank. By the use of a conversion chart comparing electrical signal time vs. water depth, the accuracy of the receiver can be determined by supplying the timed electrical signal from the calibrator corresponding to full tank, empty tank and various other depths between full and empty tank. The reading of depth on the twenty-four hour circular chart can be compared with what the depth reading should be on the conversion chart. The receiver can then be calibrated to correspond to the values on the conversion chart if there is a need.

In calibrating a transmitter, only the timing portion of the calibrator is used and no signal is applied at terminal 4. The water pressure hose from the bottom of the water tank is disconnected from the transmitter and a device for applying known pressures is connected in its place. The intermittent A-C signals, from the transmitter, are applied to the calibrator at terminal 8. With double-pole double-throw switch 10 closed to the right, the output A-C signal from the transmitter is connected to timer switch 14 through terminals 18, 22 and 24. The time of the A-C signal from the transmitter can be read directly off timer 12 by closing timer switch 14. A conversion chart is used, comparing known pressures vs. electrical signal time, to calibrate the transmitter. With known pressures applied to the transmitter, the time from timer 12 is compared with what the conversion chart time is corresponding to the pressures applied. The transmitter can be calibrated by adjustment to the proper value for accurate operation.

While the invention has been described with reference to the preferred embodiment thereof, it will be apparent that various modifications will occur to those skilled in the art within the scope of the invention as set forth in the appended claims.

I claim:

1. A transmitter-receiver calibrating device comprising: a plurality of input terminals; a double-pole double-throw switch having a first terminal at one of said poles of said double-pole double-throw switch and connected to a first of said input terminals; a constant speed motor having a first and a second terminal, with said first terminal being connected to a second of said input terminals; a mercury switch having a first and a second terminal, with said first terminal connected to said second terminal of said motor and to a second terminal of said double-pole double-throw switch, and a second terminal of said mercury switch connected to a third terminal of said double-pole double-throw switch, which is the other pole of said double-pole double-throw switch, said double-pole double-throw third terminal being connected to a third of said input terminals; a voltmeter having a first and a second terminal, with said first terminal connected to said second input terminal and said second terminal connected to a fourth terminal of said double-pole double-throw switch, with said fourth terminal connected to a fifth terminal of said double-pole double-throw switch; a timer switch having a first and a second terminal, with said first terminal connected to said fourth terminal of said double-pole double-throw switch; a timer having a first and a second terminal, with said first terminal connected to said second terminal of said timer switch and said second terminal connected to said second of said input terminals; and mechanical means connected to said motor and associated with said mercury switch, for controlling the time said mercury switch is closed.

2. A transmitter-receiver calibrating device comprising: input means adapted for passing electrical signals; a switching means having one side connected to said input means and utilized for switching said electrical signals; a liquid switching means for switching said electrical signals that are connected thereto through said switching means; a mechanical means for controlling the time said liquid switching means is closed; and a timing means connected to said liquid switching means for recording the length of time said liquid switching means is closed, said mechanical means including a cam connected to a shaft of a constant speed motor, a mechanical arm having one end attached to a pivotal frame that is positioned adjacent one side of said cam and another end of said mechanical arm having a magnet attached thereto, said pivotal frame being disposed adjacent said cam for actuation, and an adjustable pointer mechanism mounted between said frame and said cam for transmitting motion of the cam to said pivotal frame, and said liquid switch having a metallic slug electrical connection for opening and closing said liquid switch as said magnet is moved toward and away from said liquid switch.

3. A transmitter-receiver calibrating device as set forth in claim 2 wherein said mechanical means includes a cam connected to a shaft of said constant speed motor, a mechanical arm having one end attached to a pivotal frame that is positioned adjacent one side of said cam and another end of said mechanical arm having a magnet attached thereto, said pivotal frame being disposed adjacent said cam for actuation, an adjustable pointer mechanism mounted between said frame and said cam for transmitting motion of the cam to said pivotal frame, said liquid switch having a metallic slug electrical connection for opening and closing said liquid switch as said magnet is moved toward and away from said liquid switch.

References Cited

UNITED STATES PATENTS

| | | |
|---|---|---|
| 2,214,159 | 9/1940 | Bristol. |
| 2,341,251 | 2/1944 | Walther _____ 200—56 |
| 2,570,781 | 10/1951 | Duerr _____ 73—1 |
| 3,176,221 | 3/1965 | Stamler _____ 73—1 |

DAVID SCHONBERG, *Primary Examiner.*

LOUIS R. PRINCE, S. C. SWISHER, *Examiners.*